No. 710,020. Patented Sept. 30, 1902.
B. F. SHORT.
RAT TRAP.
(Application filed Feb. 13, 1902.)
(No Model.)
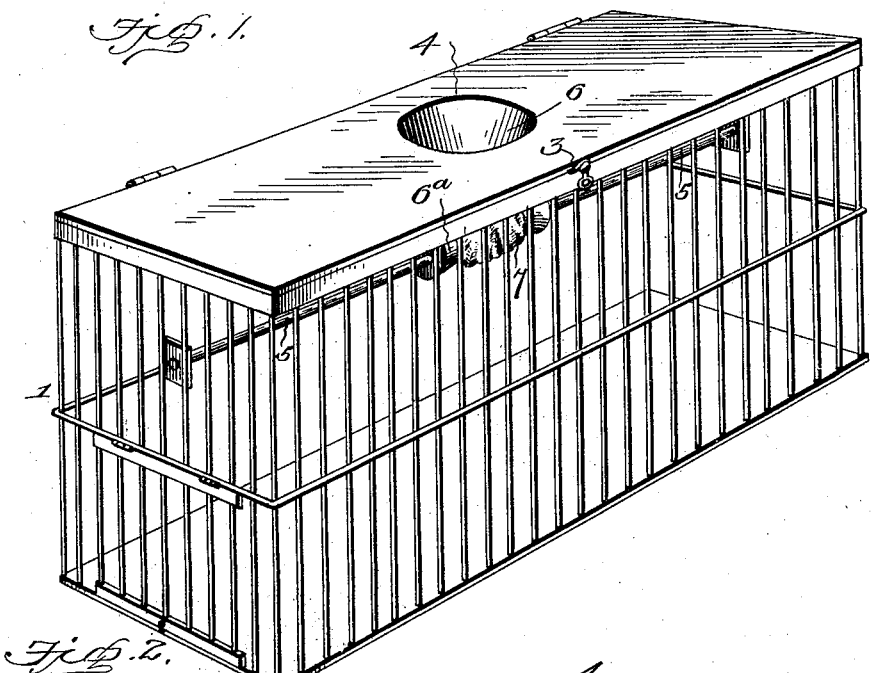
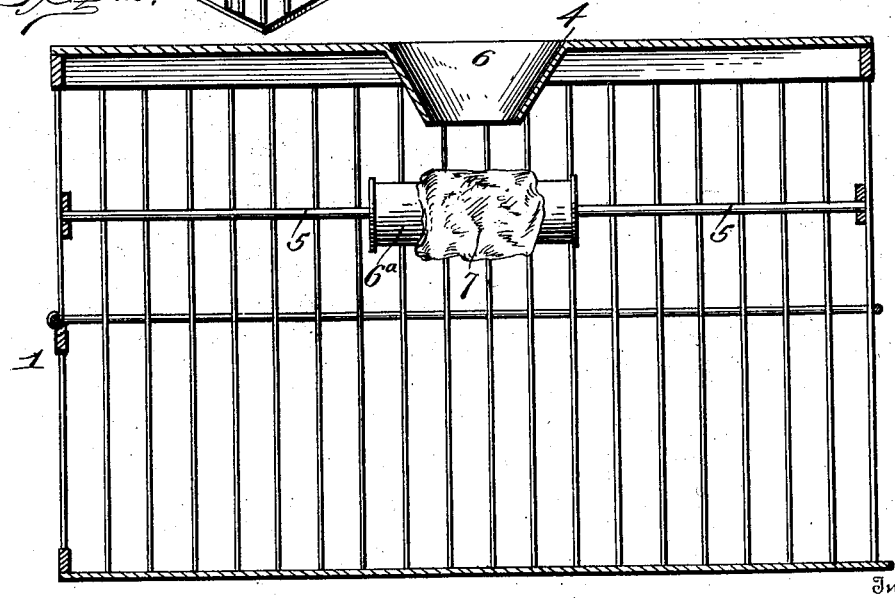
Witnesses
Inventor
B. F. Short
By
Attorneys

UNITED STATES PATENT OFFICE.

BENJAMIN FRANKLIN SHORT, OF BRANTLEY, GEORGIA.

RAT-TRAP.

SPECIFICATION forming part of Letters Patent No. 710,020, dated September 30, 1902.

Application filed February 13, 1902. Serial No. 93,905. (No model.)

*To all whom it may concern:*

Be it known that I, BENJAMIN FRANKLIN SHORT, a citizen of the United States, residing at Brantley, in the county of Marion and State of Georgia, have invented certain new and useful Improvements in Rat-Traps; and I do declare the following to be a full, clear, and exact description of the invention, such as will enable others skilled in the art to which it appertains to make and use the same.

The invention relates to rat-traps.

The object of the invention is to provide a device of this character which shall be simple of construction, durable in use, comparatively inexpensive of production, and effective in action.

With this and other objects in view the invention consists of certain novel features of construction, combination, and arrangement of parts, which will be hereinafter more fully described, and particularly pointed out in the appended claims.

In the accompanying drawings, Figure 1 is a perspective view of my improved rat-trap, and Fig. 2 is a longitudinal vertical sectional view.

Referring to the drawings, 1 denotes the body or casing of the trap, the sides and ends of which are preferably formed of wire and the top and bottom of metal plate. The top may be hinged, as shown, and provided with fastening means 3 and formed with an entrance-opening 4, having a funnel 6 leading downwardly therefrom. One of the ends of the trap may be hinged for the purpose of emptying the rats out of the trap.

5 denotes a shaft journaled longitudinally in the end pieces of the trap and extending a suitable distance above the bottom, so as to be inaccessible to the rats within the trap. Rotatably mounted upon this shaft is a spool 6ª, to which is adapted to be tied or otherwise secured the bait 7. The spool is immediately under the funnel.

A rat climbing on top of the trap and looking into it will see nothing but the bait. In descending to obtain the bait the rat will come in contact with the roller and will be whirled or spun to one side and fall upon the bottom of the trap. The bait is held a sufficient distance above the bottom of the trap to prevent the imprisoned rats from eating the same.

When it is desired to let the rats out of the trap, the hinged top may be swung back, or, if desired, one of the ends of the trap may be opened and the rat allowed to escape.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

While I have described this invention as being primarily designed for the catching of rats, it will of course be understood that it may be used with but slight modification as an animal-trap.

Having thus described my invention, what I claim, and desire to secure by Letters Patent, is—

1. The combination with a trap-casing having an opening in its upper end, of a shaft extending across the trap below the top thereof, a rotary cylindrical bait-holder carried by said shaft, and a funnel depending from said opening and having its smaller end in close proximity to the bait-holder, whereby the vision of the rodent will be directed and concentrated only to the bait-holder carried by said shaft, substantially as set forth.

2. The combination with the trap-casing having an opening in its upper end, and a funnel surrounding said opening, of a rotatable bait-holder journaled in said trap immediately below the funnel, substantially as set forth.

In testimony whereof I have hereunto set my hand in presence of two subscribing witnesses.

BENJAMIN FRANKLIN SHORT.

Witnesses:
W. B. SHORT,
W. C. SINGLETON.